(12) United States Patent
Kamel et al.

(10) Patent No.: US 8,490,201 B2
(45) Date of Patent: Jul. 16, 2013

(54) PROTECTING ACCOUNT SECURITY SETTINGS USING STRONG PROOFS

(75) Inventors: Tarek Bahaa El-Din Mahmoud Kamel, Issaquah, WA (US); Yordan I. Rouskov, Kirkland, WA (US); David J. Steeves, Seattle, WA (US); Rammohan Nagasubramani, Kirkland, WA (US); Pui-Yin Winfred Wong, Redmond, WA (US); WeiQiang Michael Guo, Bellevue, WA (US); Vikas Rajvanshy, Clyde Hill, WA (US); Orville C. McDonald, Seattle, WA (US); Sean Christian Wohlgemuth, Duvall, WA (US); Vikrant Minhas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 12/748,186

(22) Filed: Mar. 26, 2010

(65) Prior Publication Data

US 2011/0214173 A1    Sep. 1, 2011

Related U.S. Application Data

(60) Provisional application No. 61/308,617, filed on Feb. 26, 2010.

(51) Int. Cl.
*G06F 7/04* (2006.01)

(52) U.S. Cl.
USPC .................................. 726/26; 726/5

(58) Field of Classification Search
USPC .................. 726/5, 9, 23, 26–28; 713/182, 183
See application file for complete search history.

(56) References Cited

U.S. PATENT DOCUMENTS

| 6,005,935 | A | 12/1999 | Civanlar |
| 6,240,184 | B1 | 5/2001 | Huynh et al. |
| 7,216,361 | B1 | 5/2007 | Roskind et al. |
| 7,467,401 | B2 | 12/2008 | Cicchitto |
| 2001/0045451 | A1 * | 11/2001 | Tan et al. ................... 235/375 |
| 2003/0182584 | A1 | 9/2003 | Banes et al. |

(Continued)

FOREIGN PATENT DOCUMENTS

| KR | 2001048798 A | * | 6/2001 |
| KR | 1020010048798 A | | 6/2001 |
| WO | 2011106393 | | 9/2011 |

OTHER PUBLICATIONS

Just, Mike, "Designing Authentication Systems with Challenge Questions", Retrieved at <<http://hornbeam.cs.ucl.ac.uk/hcs/teaching/GA10/lec5extra/ch08just.pdf >> Aug. 5, 2005, pp. 147-160.

(Continued)

*Primary Examiner* — Samson Lemma
(74) *Attorney, Agent, or Firm* — Wolfe-SBMC (57) ABSTRACT

One or more strong proofs are maintained as associated with an account of a user. In response to a request to change a security setting of the account, an attempt is made to confirm the request by using one of the one or more strong proofs to notify the user. The change is permitted if the request is confirmed via one or more of the strong proofs, and otherwise the change to the security setting of the account is kept unchanged.

20 Claims, 6 Drawing Sheets

U.S. PATENT DOCUMENTS

| | | |
|---|---|---|
| 2004/0123162 A1 | 6/2004 | Antell et al. |
| 2009/0047928 A1 | 2/2009 | Utsch et al. |
| 2009/0125986 A1* | 5/2009 | Kiester et al. .................. 726/4 |
| 2009/0241201 A1* | 9/2009 | Wootton et al. ................. 726/28 |
| 2009/0283583 A1 | 11/2009 | Cowburn et al. |
| 2009/0319435 A1* | 12/2009 | Little et al. ..................... 705/76 |

OTHER PUBLICATIONS

Jablon, David P., "Strong Password-only Authenticated Key Exchange", Retrieved at <<https://eprints.kfupm.edu.sa/67140/1/67140.pdf>> ACM SIGCOMM Computer Communication Review, vol. 26, Issue 5, Sep. 25, 1996, pp. 1-22.

Josang, et al., "User Centric Identity Management", Retrieved at <<http://web.me.com/skjpope/downloads/files/usercentric.pdf>> 2005, pp. 1-13.

Just, Mike, "Designing and evaluating challenge-question systems". Retrieved at <<http://ieeexplore.ieee.org/stamp/stamp.jsp?arnumber=1341407&isnumber=29552>> vol. 2 No. 5, Sep.-Oct. 2004, pp. 32-39.

Just, Mike, "Designing Secure Yet Usable Credential Recovery Systems with Challenge Questions", Retrieved at <<http://www.andrewpatrick.ca/CHI2003/HCISEC/hcisec-workshop-just.pdf>> Submission to Workshop on Human-Computer Interaction and Security Systems, Apr. 6, 2003, pp. 4.

"International Search Report", Mailed Date: Oct. 27, 2011, Application No. PCT/US2011/025884, Filed Date: Feb. 23, 2011, pp. 8.

* cited by examiner

PROTECTING ACCOUNT SECURITY SETTINGS USING STRONG PROOFS

RELATED APPLICATION

This application claims priority to U.S. Provisional Application Ser. No. 61/308,617 filed Feb. 26, 2010, entitled "Protecting Account Security Settings Using Strong Proofs" to Tarek Bahaa El-Din Mahmoud Kamel et al., the disclosure of which is hereby incorporated by reference herein in its entirety.

BACKGROUND

As computing devices have become increasing commonplace, the amount of services that have become available to users over the Internet has increased. Oftentimes users set up accounts for such services, providing a user identifier (id) and password in order to access their accounts. Using accounts in this manner, however, is not without its problems. One such problem is that the user id and password is oftentimes a weak link in the authentication of user accounts because it is subject to various attacks such as brute force attacks, phishing, and so forth. If a malicious user were to gain access to a user's id and password, then the malicious user can oftentimes shut the legitimate user out by changing the user's password and any password recovery settings, preventing the legitimate user from using his or her own account.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request to change a security setting of an account of a user is received and an attempt is made to confirm the request by using a strong proof to notify the user. The change is permitted if the request is confirmed via the strong proof, and the security setting is kept unchanged if the request is not confirmed via the strong proof.

In accordance with one or more aspects, both a password and multiple strong proofs associated with an account of a user are maintained. A request to change the password (or strong proof) is received, and the requested change to the password (or strong proof) is permitted only if the change is confirmed by the user via one or more of the multiple strong proofs.

BRIEF DESCRIPTION OF THE DRAWINGS

The same numbers are used throughout the drawings to reference like features.

DETAILED DESCRIPTION

Protecting account security settings using strong proofs is discussed herein. A proof refers to a piece of data, such as an indication of a communication channel or a secret key, that is associated with a user account and that allows verification of the account holder. Multiple different tiers or levels of proofs can be used, with some proofs being deemed to be stronger than others. An account security setting, such as a strong proof or other proof (such as a password), can be changed when the requested change is confirmed using one or more strong proofs (e.g., one or more strong proofs with the same strength as or higher strength than the proof being changed). The requested change is confirmed if a notification of the requested change sent using the one or more strong proofs is confirmed. The account security setting, however, is not changed if the requested change is not confirmed.

Figure 1:
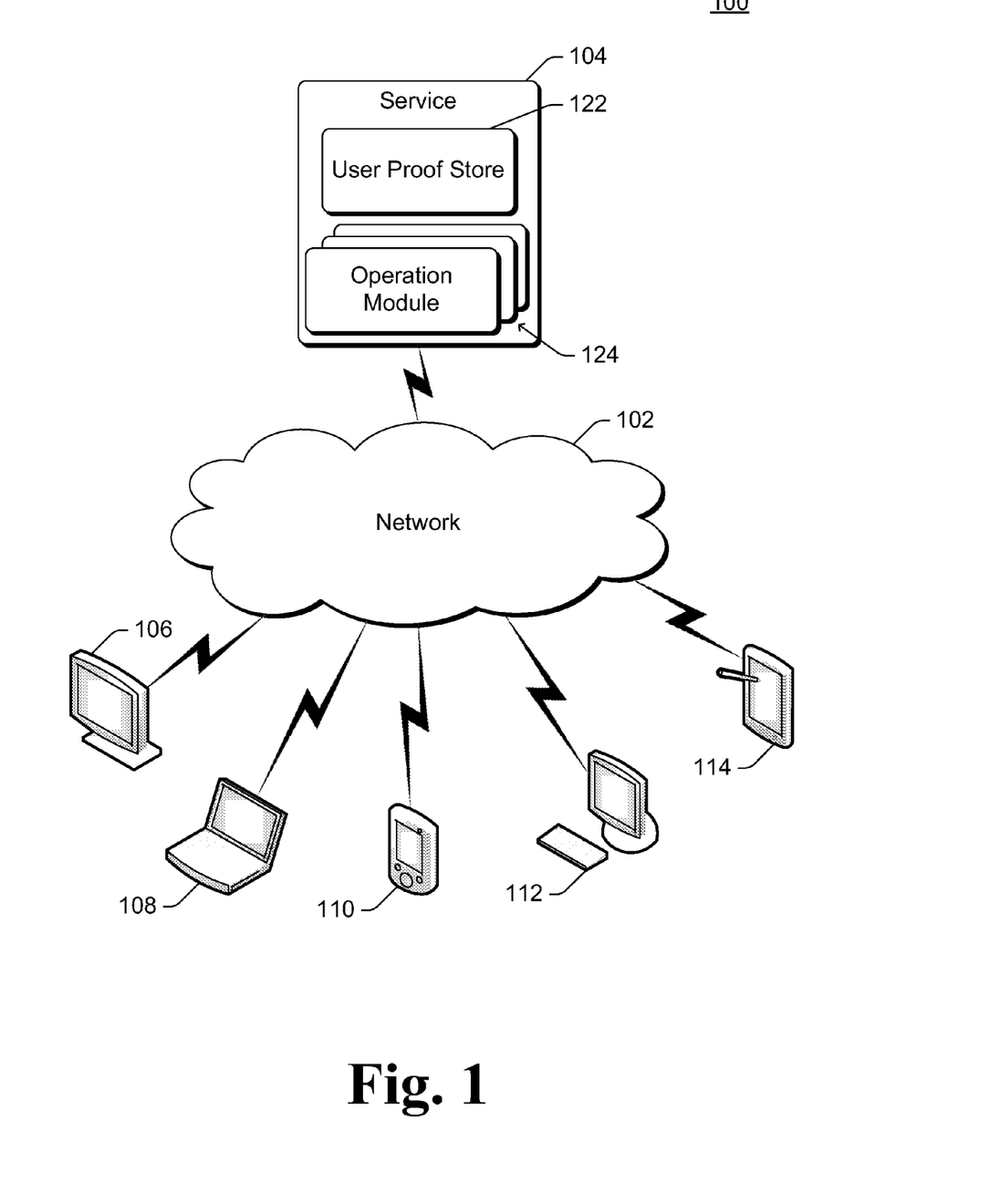
FIG. 1 illustrates an example system implementing the protecting account security settings using strong proofs in accordance with one or more embodiments.

FIG. 1 illustrates an example system 100 implementing the protecting account security settings using strong proofs in accordance with one or more embodiments. System 100 includes a network 102 via which a service 104 can communicate with one or more computing devices 106, 108, 110, 112, and 114. Network 102 can be a variety of different networks, such as the Internet, a local area network (LAN), a phone network (e.g., cellular, satellite, etc.), an intranet, other public and/or proprietary networks, combinations thereof, and so forth.

Computing devices 106-114 can be a variety of different types of computing devices. In the illustrated example, computing device 106 is a television, computing device 108 is a laptop computer, computing device 110 is a wireless phone, computing device 112 is a desktop computer, and computing device 114 is a tablet computer. However, it is to be appreciated that the protecting account security settings using strong proofs can be used with fewer than all of the computing devices 106-114 illustrated in FIG. 1. It is also to be appreciated that other types of computing devices can be used with the protecting account security settings using strong proofs, such as a mobile station, an entertainment appliance, a set-top box communicatively coupled to a display device, a game console, an automotive computer, and so forth. Thus, computing devices that communicate with service 104 can range from a full resource device with substantial memory and processor resources (e.g., personal computers, game consoles) to a low-resource device with limited memory and/or processing resources (e.g., traditional set-top boxes, handheld game consoles).

Service 104 is implemented using one or more computing devices. Similar to the discussion of computing devices 106-114, service 104 can be implemented using a variety of different types of devices, each ranging from a full resource device with substantial memory and processor resources to a low-resource device with limited memory and/or processing resources.

Service 104 includes a user proof store 122 and one or more operation modules 124. Service 104 can provide a variety of different functionality to computing devices 106-114, such as a social networking service, an email service, a messaging service, an image and/or video viewing service, a file sharing service, a gaming or other entertainment service, combinations thereof, and so forth. Operation modules 124 provide this functionality of service 104.

Users of computing devices 106-114 have an associated account on service 104, and each such user is also referred to as an account holder. In order to access the functionality of service 104, users authenticate themselves to service 104 using one or more proofs. In order to change security settings for their accounts, users confirm requested changes using one or more strong proofs. The proofs (strong proofs and other proofs) for the users are stored in user proof store 122. These proofs are data that allow verification of the account holder, as discussed in more detail below.

Figure 2:
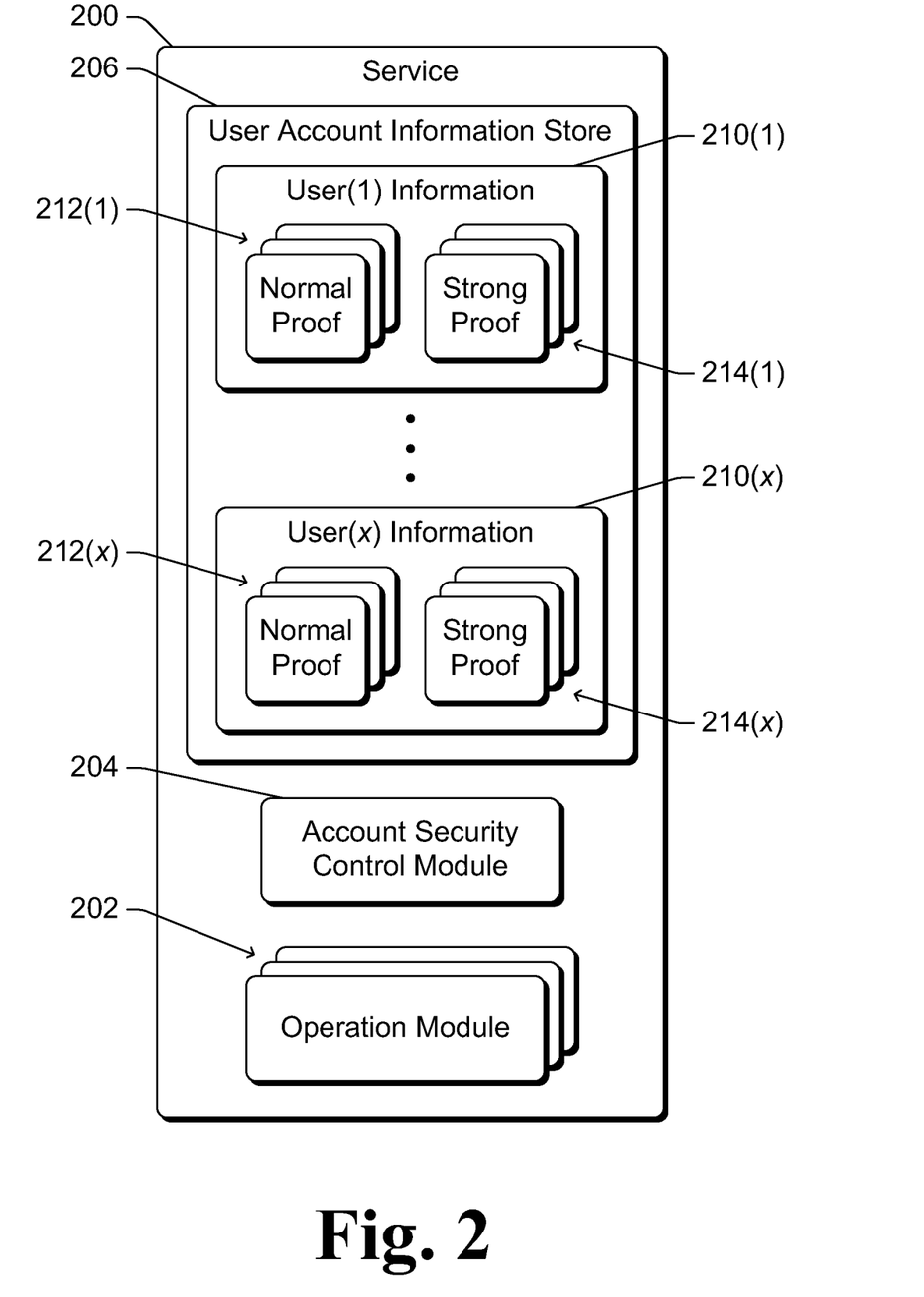
FIG. 2 is a block diagram illustrating an example service protecting account security settings using strong proofs in accordance with one or more embodiments.

FIG. 2 is a block diagram illustrating an example service 200 protecting account security settings using strong proofs in accordance with one or more embodiments. Service 200 can be, for example, service 104 of FIG. 1. Service 200 can be implemented by one or more computing devices analogous to the discussion above regarding service 104 of FIG. 1.

Service 200 includes one or more operation modules 202, an account security control module 204, and a user account information store 206. Operation modules 202 provide the functionality of service 200 (e.g., social networking functionality, email functionality, messaging functionality, etc.) analogous to operation modules 124 of FIG. 1.

Account security control module 204 manages security settings of accounts of users of service 200. These security settings include proofs that are stored in user account information store 206 (which is analogous to proof store 122 of FIG. 1). This managing of the security settings includes adding new proofs as appropriate, removing proofs as appropriate, changing proofs as appropriate, and so forth.

A proof is data that is associated with a user account and that allows authentication or verification of the account holder. A variety of different types of proofs can be used by service 104. One type of proof is an indication of a communication channel via which information intended for the user can be communicated to the user. An indication of a communication channel is data indicating how that communication channel is accessed (e.g., an email address, a wireless phone number, etc.). Another type of proof is data that is a secret key. The secret key can be a secret maintained by a user (such as a password or passphrase remembered by the user), or a device identifier (such as a secret key of a particular computing device, a secret key of a smartcard, and so forth).

User account information store 206 includes user account information 210(1), . . . 210(x) for multiple (x) users of service 200. For each user, one or more normal proofs 212 and one or more strong proofs 214 are stored. Additional information regarding the accounts of users can also be stored in user account information 210, such as additional security settings, account configuration settings, communication channels the user desires to use, and so forth.

Normal proofs 212 and strong proofs 214 can be distinguished from one another in user account information store 206 in a variety of different manners. For example, user account information 210 can be stored in accordance with a data structure in which particular fields are identified as strong proofs (and data in such a field is a strong proof) and particular fields are identified as normal proofs (and data in such a field is a normal proof). By way of another example, one or more proofs 212, 214 can have associated metadata that identifies whether the proof is a normal proof or a strong proof.

In one or more embodiments, proofs are categorized as normal proofs or strong proofs, with strong proofs being stronger than normal proofs. Generally, a first proof is deemed to be stronger than a second proof if the first proof is deemed to be more difficult for a malicious user (e.g., any user other than the legitimate account holder) to compromise than the second proof. For example, passwords are considered normal proofs. Strong proofs generally include indications of communication channels and indications of devices. For example, strong proofs can be email addresses, mobile phone numbers (to which messages (such as SMS (Short Message Service) messages or MMS (Multimedia Messaging Service) messages can be sent), phone numbers (to which audible messages can be communicated), computing devices with secret keys (which can be data or configuration information on the device allowing the device to prove itself), a smartcard device with a secret key, and so forth. Account security control module 204 is pre-configured with, or otherwise has access to, indications of which types of proofs are strong proofs and which types of proofs are normal proofs.

A strong proof can be used by account security control module 204 as a basis for verifying that a particular user is indeed the legitimate account holder, and confirming changes to security settings. In situations where the strong proof is an indication of a communication channel, a notification is communicated via the indicated communication channel. For example, a text message is sent to a mobile phone number strong proof, an email message is sent to an email address strong proof, a voice call is made to a phone number strong proof, and so forth. The notification includes a secret that can be used by the recipient of the notification to prove they received the notification and agree with the action of which he or she is notified. This secret can take a variety of different forms, such as a one-time code that is presented to the user and that the user subsequently enters when he or she requests to use service 200, a hyperlink that includes a secret and which the user clicks on to indicate that he or she received the notification, and so forth. The user responds to the notification (e.g., entering the one-time code, selecting the hyperlink, etc.), providing the secret included in the notification to account security control module 204 to confirm the requested change is to be permitted.

Such a notification is sent to the indicated strong proof, so if a response to the notification is received then account security control module 204 assumes that the legitimate account holder received the notification and approves of the action of which he or she is notified. For example, if a malicious user were to compromise the password of a user and attempt to change the password on the account, a notification can be communicated to the legitimate user via the strong proof (which has presumably not been compromised by the malicious user). The legitimate user thus receives the notification that the password change has been attempted and does not respond to the notification because he or she did not request the password change (or responds with an indication that the requested change is to be denied and thus is not confirmed). However, if the account holder were to attempt to change the password on the account, a notification is communicated to the legitimate user (the account holder) via the same strong proof, and the user does respond to the notification (inherently or explicitly indicating that the requested change is to be permitted) because he or she did request the password change. This response is the confirmation that the requested change is to be permitted.

In situations where a strong proof is an indication of a device, a secret key of the device is detected by account security control module 204. The secret key of the device is a secret that distinguishes the device from other devices and allows the device to prove itself. For example, data can be written to a user's device and maintained as a secret, and this secret data is also stored as a strong proof. If a user requests to use service 200 via a particular device, then account security control module 204 can retrieve this secret data from the particular device and compare it to the device indication strong proof in user account information store 206. If the comparison indicates the secret data from the device and the device indication strong proof are the same, then the particular device is indeed the user's device. Such a device can be, for example, a computing device, a wireless phone, a smartcard, and so forth.

The secret key of the device can be generated or obtained in a variety of different manners. For example, the secret key of the device can be generated and assigned to the device by account security control module 204, or the secret key of the device can be generated by the device itself (which in turn communicates the secret key to module 204). By way of another example, the secret key of the device can be generated by another device (e.g., a trusted third party) and obtained by the device (which in turn communicates the secret key to module 204) or obtained by module 204 (which in turn communicates the secret key to the device). The secret key can be generated in different manners, such as by generating random data, by generating data based on the particular device (e.g., a device serial number, a hash value generated by applying a hash function to one or more programs or files of the device, etc.), and so forth.

When the user accesses service 200 using a device that is confirmed as the user's device (based on a device indication strong proof), account security control module 204 communicates notifications to the device. These notifications are similar to those sent via communication channels as discussed above. However, as the device is confirmed as the user's device, the secret is inherent in the notification and any response to the notification. Such a notification is communicated using the strong proof due to the notification being communicated to a device that is confirmed as the user's device (based on the strong proof). The notification is displayed or otherwise presented as (or causes display or other presentation of) a user interface to the user of the device, requesting a response from the user. The user interface can be generated by the device, or alternatively by account security control module 204 (and communicated to the device for display or other presentation). A response to the notification by the user using a device that is confirmed as the user's device (based on a device indication strong proof) is the confirmation that the requested change is to be permitted. The user can enter a response in a variety of different manners (e.g., selecting a button, selecting a hyperlink, etc.). It is to be appreciated that a notification could provide the option for the user to accept or reject the change, and that confirmation that the requested change is to be permitted is received only if the user selects the option to accept the change (e.g., the user presses an "Accept Change" button).

For example, if a malicious user were to compromise the password of a user and attempt to change the password on the account, an attempt is made to confirm the change by communicating a notification to a device indication strong proof (which has presumably not been compromised by the malicious user). If the user accesses service 200 using a device that is confirmed as the user's device (based on the device indication strong proof), an indication of the password change attempt is displayed via the user's device and the user can ignore the indication or select a "Deny Password Change" button because he or she did not request the password change. However, if the account holder were to attempt to change the password on the account, the user can select an "Accept Password Change" button to confirm that the requested change is permitted.

Different levels or tiers of normal proofs or strong proofs can be used, with proofs of a higher tier being considered stronger than proofs of a lower tier. These proofs can be assigned a particular value based on the tier they are part of. For example, an email address may be assigned a value of "4", and a mobile phone number to which messages can be sent may be assigned a value of "6". These values can be used by account security control module 204 to determine when account security settings can be changed as discussed in more detail below.

In order to use the functionality of service 200, a user establishes an account with service 200. When establishing an account, the user typically provides (or is assigned or otherwise obtains) a user identifier and a password, which are also referred to as credentials of the user. The password is a normal proof, and is also considered a security setting of the account of the user. The user can also add one or more additional security settings to the account as he or she desires. These additional security settings include, for example, other normal proofs, strong proofs, other user identifiers associated with the account, restrictions on the manner in which the account can be used, and so forth.

In one or more embodiments, the user adds additional proofs to his or her account. The first proof added (when the user has no strong proofs) that is of a type that is a strong proof is automatically deemed by account security control module 204 to be a strong proof. Subsequently added proofs that are of a type that are strong proofs are deemed by module 204 to be strong proofs only if confirmed via one or more other strong proofs, as discussed in more detail below. Such subsequently added proofs are normal proofs until confirmed via one or more strong proofs. Alternatively, subsequently added proofs that are of a type that are strong proofs are automatically deemed by module 204 to be strong proofs if such subsequent proofs are added to the user account within a threshold amount of time (e.g., three days, one week, etc.) of when the account is established.

Additionally, account security control module 204 can be configured to identify proofs entered prior to a particular date or time as being strong proofs. Such accounts are also referred to as pre-existing accounts. For example, module 204 can determine that proofs in user accounts that were established prior to a particular date are automatically strong proofs. Following this example, all proofs that are of a type that is a strong proof and that are included in a user account established prior to the particular date are automatically made strong proofs by module 204.

After establishing an account, a user accesses the functionality of service 200 by providing his or her user credentials to service 200 (or alternatively another component or module that communicates with service 200). Account security control module 204 authenticates the user credentials by obtaining user account information 210 for the account holder and checking user account information 210 for a password associated with the account holder. For example, module 204 checks that a password provided by the user is indeed a password associated with that user's account. If the user credentials are not authenticated, then the user is not permitted to access the functionality of service 200.

However, if the user credentials are authenticated, the user is permitted to access the functionality of service 200. For example, the user can send emails, read files, and so forth. However, the user is not able to change security settings (such as strong proofs) unless the change is confirmed by the user via one or more other strong proofs that are at least as strong as the proof being changed. The user is not able to change a strong proof simply by providing a normal proof. Thus, for example, if an account holder's password were compromised by a malicious user but the user's strong proofs were not compromised, then the malicious user would not be able to change any of the strong proofs in the holder's account. Situations can arise where the malicious user can still access certain functionality of service 104 via the account holder's account, such as sending emails, but the strong proofs on the holder's account cannot be changed.

In one or more embodiments, a security setting can be changed only if confirmed via a strong proof. In other embodiments, a security setting at one level or tier can only be changed if confirmed by a security setting at the same or higher level or tier. For example, if a strong proof that is a mobile phone number is at a higher tier than an email address, then an email address strong proof of the user can be changed if confirmed by an email address strong proof or a mobile phone number strong proof, but a mobile phone number strong proof cannot be changed even if confirmed by an email address strong proof.

In other embodiments, security settings at particular levels or tiers are assigned particular values as discussed above. A security setting at one level or tier can only be changed if confirmed by one or more security settings that have combined values that equal or exceed the value of the security setting the change of which is requested. For example, assume an email address strong proof has a value of "4", a mobile phone number to which messages can be sent strong proof has a value of "6", and a smartcard identifier strong proof has a value of "10". If a change to the smartcard identifier strong proof is requested, then the change is permitted if confirmed by both the email address strong proof and the mobile phone number to which messages can be sent strong proof, but not if confirmed by only one of the email address strong proof and the mobile phone number to which messages can be sent strong proof. However, either one or both of the email address strong proof and the mobile phone number to which messages can be sent strong proof can be changed if confirmed by just the smartcard identifier strong proof.

It should be noted that when a request is made to change a strong proof, the request can be confirmed based at least in part on that strong proof. For example, an email address strong proof can be changed if confirmed via a notification sent to that same email address strong proof.

Many of the discussions herein refer to using strong proofs to determine whether a requested change to a security setting of a user account can be made. Strong proofs can also be used by service 200 in other manners. For example, strong proofs can be used to authenticate a user, to control access to specific functionality of service 200, to permit access to security from a remote device (e.g., to a computing device accessing service 200 via the Internet), to control access to a particular resource (e.g., a particular folder or set of folders, a particular storage device, and so forth), to permit a computing device to operate as a terminal (e.g., using the RDP (Remote Desktop Protocol)), and so forth. Service 200 can allow such a requested action (e.g., a request to access a particular resource) only if confirmation that the requested action is to be performed is received using one or more of the strong proofs.

Additionally, service 200 can assign particular values to different functionality, and allow access to that functionality to be confirmed by one or more strong proofs having an (optionally combined) value that is at least equal to the assigned value. For example, permission to access a particular storage device can be assigned a value of "7", and access to the particular storage device is permitted only if confirmed by one or more security settings that have combined values of at least "7".

Figure 3:
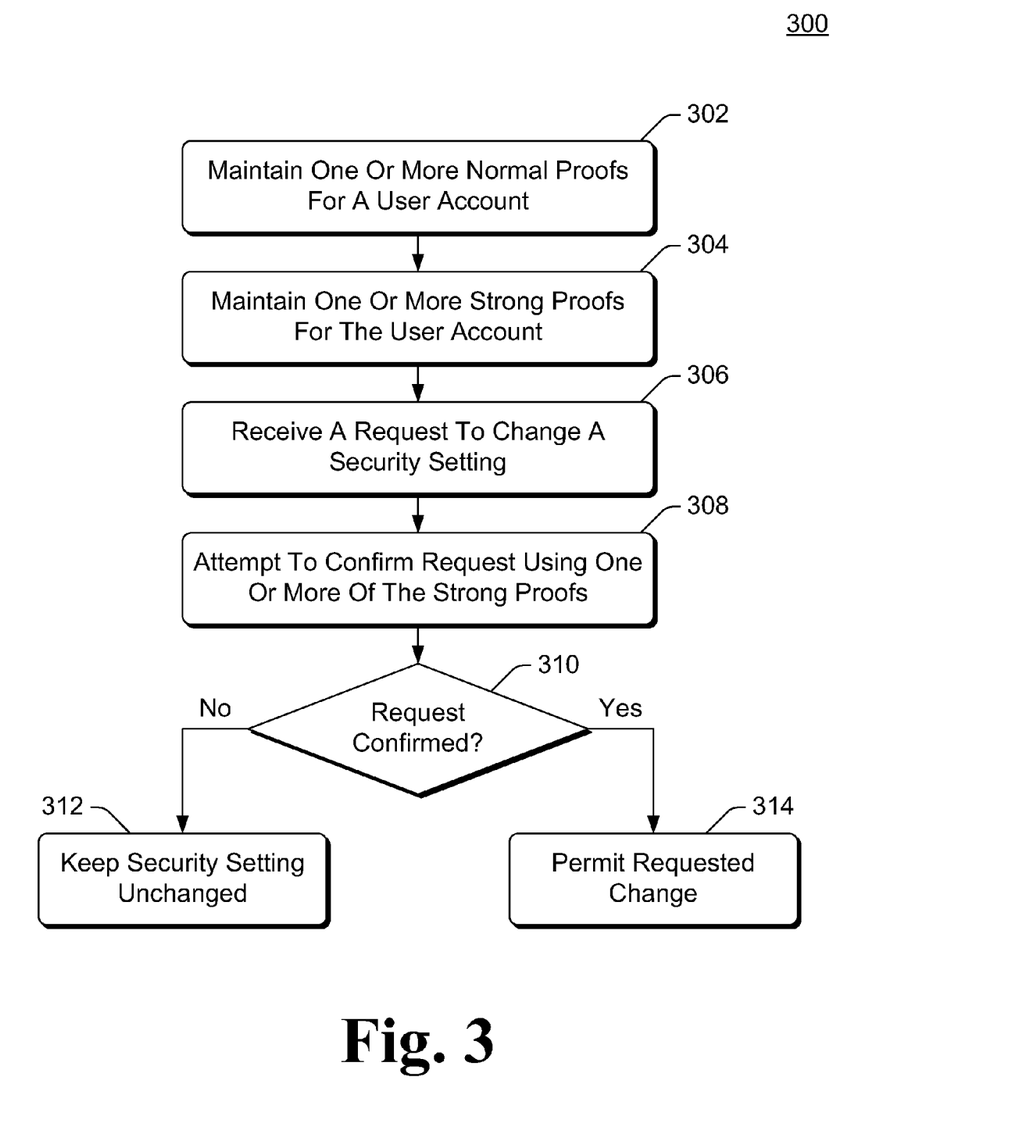
FIG. 3 is a flowchart illustrating an example process for a service implementing the protecting account security settings using strong proofs in accordance with one or more embodiments.

FIG. 3 is a flowchart illustrating an example process 300 for a service implementing the protecting account security settings using strong proofs in accordance with one or more embodiments. Process 300 is carried out by a service, such as service 200 of FIG. 2, and can be implemented in software, firmware, hardware, or combinations thereof. Process 300 is shown as a set of acts and is not limited to the order shown for performing the operations of the various acts. Process 300 is an example process for a service implementing the protecting account security settings using strong proofs; additional discussions of a service implementing the protecting account security settings using strong proofs are included herein with reference to different figures.

In process 300, one or more normal proofs for a user account are maintained (act 302). A normal proof is, for example, a password as discussed above.

One or more strong proofs for the user account are also maintained (act 304). A variety of different types of strong proofs can be maintained, such as indications of communication channels and indications of devices as discussed above.

A request to change a security setting of the user account is received (act 306). This security setting can be one of the normal proofs, one of the strong proofs, or alternatively another setting as discussed above. The requested change can be, for example, a request to add a new strong proof, a request to delete a strong proof, a request to change a strong proof, and so forth.

In response to the request, an attempt is made to confirm the request using one or more of the strong proofs (act 308). This attempt can be made by communicating notifications using the strong proofs as discussed above.

Process 300 proceeds based on whether the request is confirmed (act 310). A time limit can optionally be imposed in act 310 so that if the request is not confirmed (e.g., a notification is not responded to by the user) within a threshold amount of time then the request is determined to be not confirmed. Alternatively, no such time limit may be imposed, but the requested change is not made until the request is confirmed. The request can be confirmed in different manners as discussed above, such as user selection of a button, user selection of a hyperlink, user selection of an "Accept Change" button, user entry of a one-time code, and so forth.

If the request is not confirmed, then the requested change is not performed and the security setting for which the request was received is kept unchanged (act 312). However, if the request is confirmed, then the requested change is permitted (act 314). Thus, the requested change is permitted only if the change is confirmed via one or more of the strong proofs.

Returning to FIG. 2, situations can arise where a particular user loses all of his or her strong proofs. Such situations can arise, for example, where the user changes his or her phone number, changes his or her email address, changes his or her computer or smartcard, and so forth. In such situations, a user provides an indication to service 200 that all of his or her strong proofs have been lost. This indication can be provided in a variety of different manners, such as by sending an email or message to service 200, selecting a button or menu item in a user interface when accessing service 200, selecting a button or menu item in a configuration or account setting user interface of service 200, and so forth.

In response to receiving an indication that all of a user's strong proofs have been lost, account security control module 204 communicates multiple notifications based on the strong proofs of the user. One or more notifications are communicated using each of the strong proofs of the user, and the particular manner in which the notification is communicated can vary based on the particular type of strong proof as discussed above. For example, if the user has an email address strong proof, a mobile phone number to which messages can be sent strong proof, and a smartcard identifier strong proof, then one or more notifications are sent to the email address that is the email address strong proof, one or more notifications are sent to the mobile phone number that is the mobile phone number to which messages can be sent strong proof, and one or more notifications are communicated to the smartcard identified by the smartcard identifier strong proof.

It is to be appreciated that this communicating of notifications in response to an indication that all of a user's strong proofs have been lost may not be successful, and can include attempts to communicate notifications. For example, if an email address no longer exists then the notification sent to that email address may be deleted or bounce back to account security control module 204. By way of another example, a user may not access service 200 using a particular smartcard device, in which case although module 204 attempts to communicate the notification to that particular smartcard device, such a notification is not actually communicated because that particular smartcard device did not access service 200 (so service 200 could not communicate the notification).

The notifications communicated by account security control module 204 indicate that service 200 has received an indication that all of the user's strong proofs have been lost. If the legitimate account user has indeed lost all of his or her strong proofs, then the notifications will not be received by the user and thus the user will not respond to the notifications. However, if the legitimate account user has not actually lost all of his or her strong proofs (e.g., a malicious user has obtained the password for the account and is attempting to delete all of the user's strong proofs), then the legitimate account user will receive the notifications. The user can respond to the notification in a variety of different manners (e.g., analogous to confirming a change to an account security setting).

After communicating the notifications, account security control module 204 waits a threshold amount of time. This threshold amount of time can vary and can be, for example, 21 days, 30 days, 45 days, and so forth. If no response to any of the notifications is received within the threshold amount of time, then account security control module 204 expires all the strong proofs of the user. Expiring a strong proof refers to the strong proof no longer being a strong proof. Module 204 can expire the strong proof in different manners, such as deleting the strong proof from user account information store 206, changing the strong proof into a normal proof, keeping the data that was the strong proof in the user account information 210 but no longer treating it as a strong proof, and so forth.

It should be noted that while account security control module 204 is waiting this threshold amount of time, service 200 is still available to the user. Although the strong proofs are not expired until the threshold amount of time elapses, a user with the password to the account can still make use of the normal functionality of the account (e.g., read and send emails, read and send messages, etc.).

Figure 4:
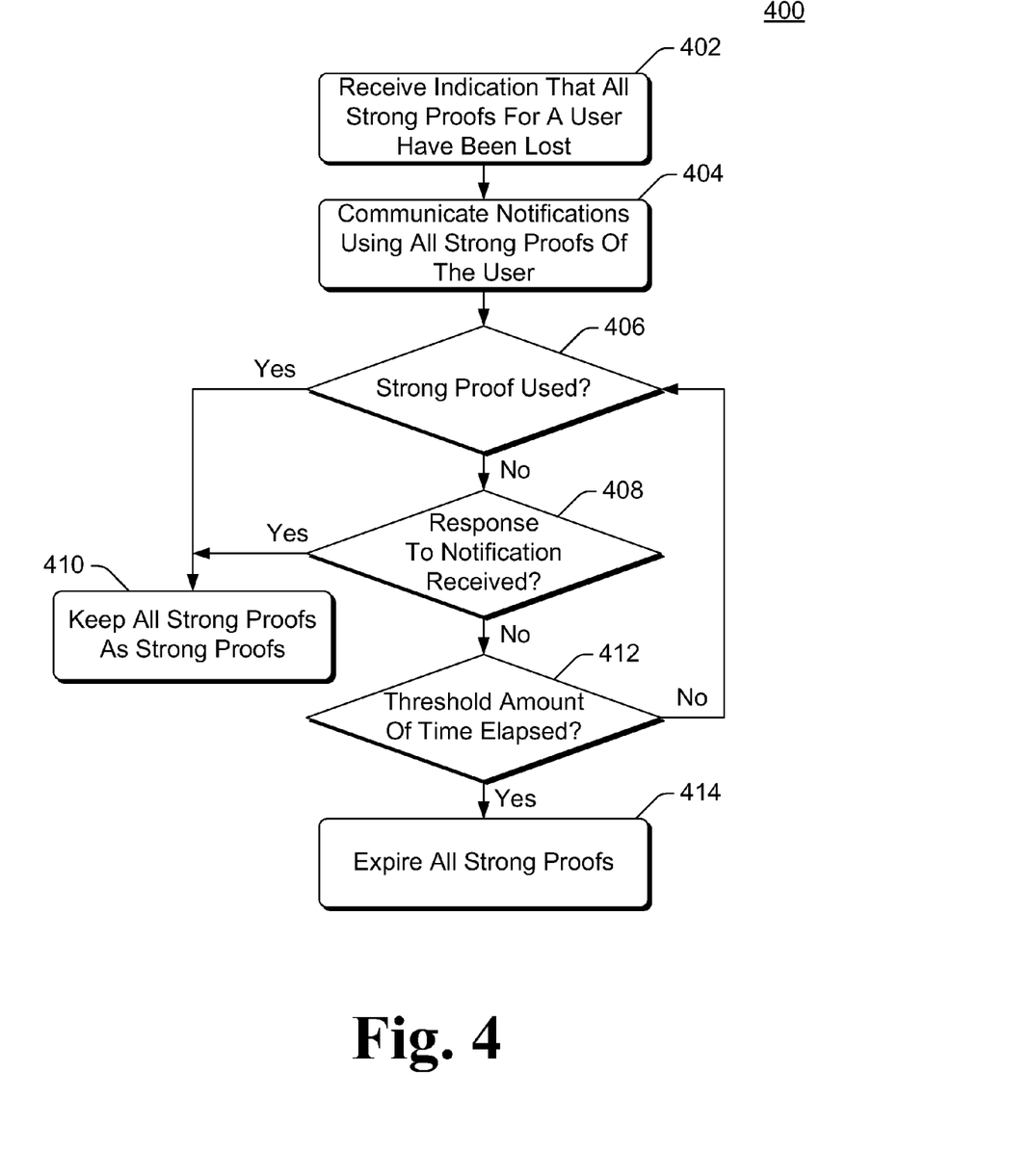
FIG. 4 is a flowchart illustrating an example process for a service managing all of the strong proofs of a user being lost in accordance with one or more embodiments.

FIG. 4 is a flowchart illustrating an example process 400 for a service managing all of the strong proofs of a user being lost in accordance with one or more embodiments. Process 400 is carried out by a service, such as service 200 of FIG. 2, and can be implemented in software, firmware, hardware, or combinations thereof. Process 400 is shown as a set of acts and is not limited to the order shown for performing the operations of the various acts. Process 400 is an example process for a service managing all of a user's strong proofs being lost; additional discussions of a service managing all of a user's strong proofs being lost are included herein with reference to different figures.

In process 400, an indication that all strong proofs for a user have been lost is received (act 402). This indication can be received in a variety of different manners as discussed above.

In response to the received indication, notifications are communicated using all of the strong proofs of the user (act 404). Notifications can be communicated in different manners as discussed above, such as presentation of a user interface on device of the user, sending a text message to a mobile phone number of the user, and so forth. Alternatively, notifications can be communicated using less than all of the strong proofs of the user.

Process 400 proceeds based on whether one of the strong proofs is used (act 406) and/or whether a response to one or more of the notifications sent in act 404 is received (act 408). A strong proof can be used in different manners, such as accessing a service (e.g., service 200 of FIG. 2) using a device that is confirmed as the user's device (based on a device indication strong proof), sending a communication from an email address or mobile phone number that is a strong proof, and so forth. If a strong proof is used and/or a response is received then all strong proofs are kept as strong proofs (act 410).

If a strong proof is not used and a response is not received, then process 400 proceeds based on whether a threshold amount of time has elapsed (act 412). This threshold amount of time can be different amounts of time, such as 30 days.

If the threshold amount of time has not elapsed, process 400 returns to act 406. Process 400 remains in acts 406, 408, and 412 until a strong proof is used in act 406, a response to a notification is received in act 408, or the threshold amount of time has elapsed in act 412. If the threshold amount of time elapses without a strong proof being used and without a response to a notification being received, then all of the strong proofs are expired (act 414). After act 414 the user has no strong proofs, and can subsequently add one or more strong proofs to his or her account as discussed above.

In one or more embodiments, the response received in act 408 (regardless of the type of the response) indicates that the user has not lost all of his or her strong proofs. Thus, regardless of the type of response, all strong proofs are kept as strong proofs in response to a response in act 408. Alternatively, the type of the response to the notification received in act 408 can determine whether all strong proofs are kept as strong proofs. For example, the user can select a link or button to provide a "veto" or "still have my strong proofs" response to indicate that he or she has not lost all of his or her strong proofs. Upon receiving such a response, all strong proofs are kept as strong proofs in act 410. The user could alternatively select a different link or button to provide an "accept" or "I lost all my strong proofs" response to indicate that he or she has lost all of his or her strong proofs. Upon receiving such a response, process 400 can continue through acts 406, 408, and 412, or alternatively can expire all strong proofs (act 414). It is to be appreciated that if the user provides an "accept" or "I lost all my strong proofs" response that he or she has most likely not actually lost all of his or her strong proofs (if they had been lost no response would be received), however the user can use this technique to quickly and easily expire all of his or her strong proofs.

Figure 5:
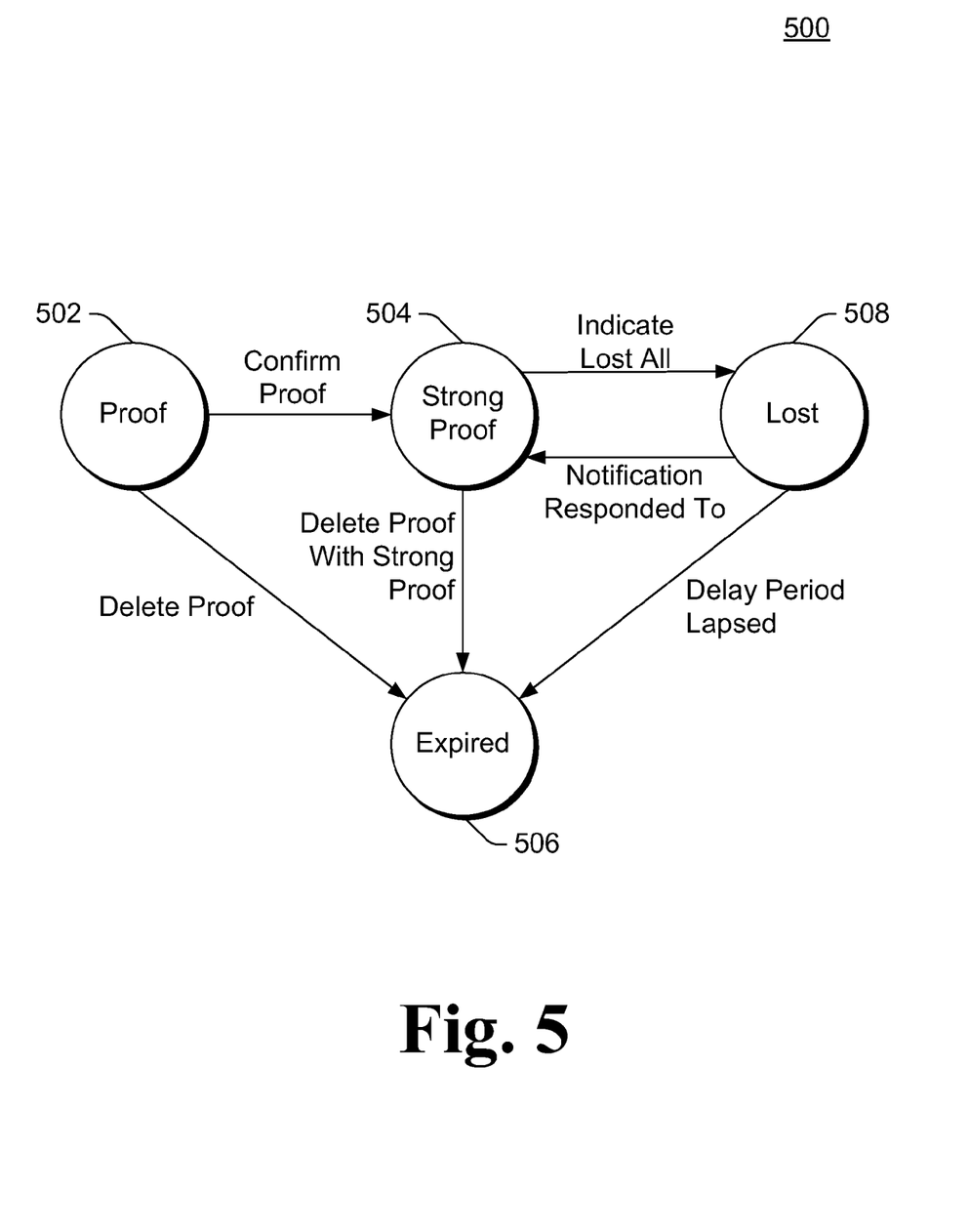
FIG. 5 is a state diagram illustrating the life cycle of a strong proof in accordance with one or more embodiments.

FIG. 5 is a state diagram 500 illustrating the life cycle of a strong proof in accordance with one or more embodiments. A proof is initially a normal proof (state 502), and once confirmed becomes a strong proof (state 504). The proof can be confirmed automatically, such as if the proof is the first proof of a type that is a strong proof, or is added within a threshold amount of time of when a user account is established as discussed above. Alternatively, the proof can be confirmed via one or more other strong proofs as discussed above. Rather than being confirmed as a strong proof the proof can be deleted, in which case the proof becomes expired (state 506). An expired proof is no longer valid, and is no longer considered a strong proof or used to confirm requests. In one or more embodiments, the normal proof is an account security setting that can be deleted only if confirmed via one or more strong proofs as discussed above. Alternatively, a normal proof can be deleted without being confirmed via one or more strong proofs.

When the proof is a strong proof (state 504), the proof can be deleted, in which case the proof becomes expired (state 506). The strong proof is an account security setting that can be deleted only if confirmed via one or more strong proofs as discussed above. If an indication that all strong proofs have been lost is received, then the proof becomes lost (state 508). While lost, notifications are sent using all of the strong proofs of the user. The proof remains lost until a notification is responded to (or a strong proof is used) or the threshold amount of time elapses. If a notification is responded to (or a strong proof is used) then the proof returns to being a strong proof (state 504). However, if the threshold amount of time elapses without one or more of the notifications being responded to (or one or more strong proofs being used), the proof becomes expired (state 506).

Additionally, in one or more embodiments strong proofs can be expired automatically by the account security control module (e.g., module 204 of FIG. 2). The account security control module can determine when to automatically expire a strong proof, such as when stronger proofs are available. For example, account security control module 204 can be configured to maintain at least a threshold number (e.g., five or ten) strong proofs for each user. When a user has added more than this threshold number of strong proofs, one or more of the strong proofs are automatically deleted by the account security control model. The strong proofs that are automatically deleted are the strong proofs deemed by the account security control module 204 to be the weaker strong proofs. By way of another example, account security control module 204 can be configured to accept particular strong proofs if at least the threshold number of other strong proofs are not included in the account, but to delete those particular strong proofs if at least the threshold number of other strong proofs are included in the account.

It is to be appreciated that the protecting account security settings using strong proofs discussed herein supports a variety of different usage scenarios. For example, a social networking service can allow a user to add multiple strong proofs to his or her account. If a malicious user were to obtain the user's password and access the user's account, the malicious user would not be able to change any of the user's account security settings (including normal proofs and strong proofs) without confirmation from the legitimate user. Upon receiving a notification (via a strong proof) of an account security setting change request that the legitimate user did not request, the legitimate user can access the service and change his or her password. Thus, the user can quickly and easily recover from having his or her password being stolen and need not contact a customer service department in order to regain access to his or her account. Furthermore, a malicious user would not be able to have all of the user's strong proofs deleted by indicating that all of the user's strong proofs were lost. If a malicious user were to provide such an indication, the legitimate user would receive a notification (via a strong proof) that all were indicated as lost, and would respond to indicate all were not lost. In response, all strong proofs would be kept as strong proofs and the malicious user's attempt to remove all the user's strong proofs would fail.

Figure 6:
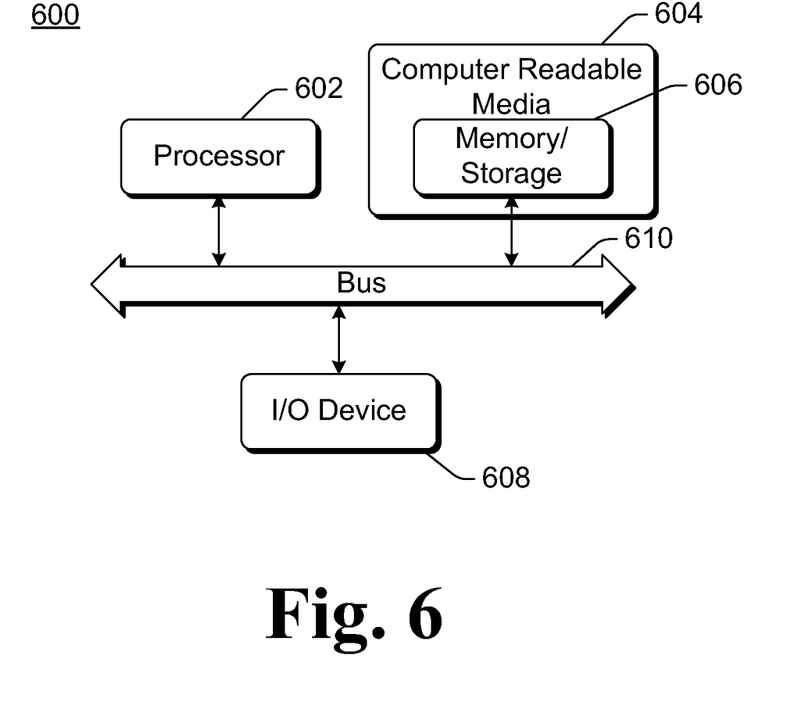
FIG. 6 illustrates an example computing device that can be configured to implement the protecting account security settings using strong proofs in accordance with one or more embodiments.

FIG. 6 illustrates an example computing device 600 that can be configured to implement the protecting account security settings using strong proofs in accordance with one or more embodiments. Computing device 600 can be, for example, a computing device 106-114 of FIG. 1, can be used to implement at least part of service 104 of FIG. 1, can be used to implement at least part of service 200 of FIG. 2, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The term "module" as used herein generally represents software, firmware, hardware, or combinations thereof. In the case of a software implementation, the module represents program code that performs specified tasks when executed on a processor (e.g., CPU or CPUs). The program code can be stored in one or more computer readable memory devices, further description of which may be found with reference to FIG. 6. The features of the protecting account security settings using strong proofs techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
under control of one or more computer processors configured with executable instructions:
receiving a request to change a security setting of an account of a user, wherein the account includes multiple strong proofs each being associated with one of multiple tiers of proofs;
attempting to confirm the request by notifying, using a strong proof of the account, the user;
permitting the change if the request is confirmed; and
keeping the security setting unchanged if the request is not confirmed.

2. A method as recited in claim 1, wherein the security setting is a password of the account.

3. A method as recited in claim 1, wherein the security setting is a first strong proof of the multiple strong proofs, and wherein the attempting comprises attempting to confirm the request by notifying, using one or more of the multiple strong proofs that are at a higher tier than the first strong proof, the user.

4. A method as recited in claim 1, wherein the security setting is a first strong proof of the multiple strong proofs, and wherein the attempting comprises attempting to confirm the request by notifying, using two or more of the multiple strong proofs that are at a lower tier than the first strong proof, the user.

5. A method as recited in claim 1, wherein the request comprises a request to add an additional strong proof to a set of multiple strong proofs associated with the account.

6. A method as recited in claim 1, wherein multiple strong proofs are associated with the account, the method further comprising:
receiving an indication that all of the multiple strong proofs have been lost;
communicating, for each of the multiple strong proofs, a notification using the strong proof;
keeping each of the multiple strong proofs as a strong proof if a response to one or more of the notifications is received within a threshold amount of time; and
expiring each of the multiple strong proofs if no response to the notifications is received within the threshold amount of time.

7. A method as recited in claim 1, further comprising:
identifying that the account is a pre-existing account of the user; and
automatically identifying, in response to the account being identified as a pre-existing account, each of multiple proofs of the pre-existing account as a strong proof associated with the account.

8. A method as recited in claim 1, further comprising:
identifying a first proof associated with the account as a strong proof, and identifying each of one or more additional proofs associated with the account as an additional strong proof only if the additional proof is confirmed, using another strong proof, as to be added as the additional strong proof.

9. A method as recited in claim 1, further comprising permitting access to a service associated with the account despite the change being denied.

10. A method as recited in claim 1, wherein the strong proof of the account comprises an email address of the user.

11. A method as recited in claim 1, wherein the strong proof of the account comprises a wireless phone number of the user.

12. A method as recited in claim 1, wherein the strong proof of the account comprises a secret key of a smartcard of the user.

13. One or more computer hardware storage devices having stored thereon multiple instructions that, when executed by one or more processors of one or more computing devices, cause the one or more processors to:
maintain both a password and multiple strong proofs associated with an account of a user, wherein each of the multiple strong proofs is associated with one of multiple tiers of proofs;
receive a request to change the password; and
permit the requested change to the password only if the change is confirmed via one or more of the multiple strong proofs.

14. One or more computer hardware storage devices as recited in claim 13, wherein the multiple instructions further cause the one or more processors to:
receive a request to change a first strong proof of the multiple strong proofs;

attempt to confirm the request by sending one or more notifications, using one or more of the multiple strong proofs that are at a higher tier than the first strong proof, to the user; and permit the requested change to the first strong proof only if a confirmation of the requested change to the first strong proof is received from the user in response to the one or more notifications.

15. One or more computer hardware storage devices as recited in claim 13, wherein the multiple instructions further cause the one or more processors to:

receive a request to change a first strong proof of the multiple strong proofs, wherein each of the multiple strong proofs is associated with one of multiple tiers of proofs;

attempt to confirm the request by sending one or more notifications, using two or more of the multiple strong proofs that are at a lower tier than the first strong proof, to the user; and permit the requested change to the first strong proof only if a confirmation of the requested change to the first strong proof is received from the user in response to the one or more notifications.

16. One or more computer hardware storage devices as recited in claim 13, wherein the multiple instructions further cause the one or more processors to:

receive an indication that all of the multiple strong proofs have been lost;

send, for each of the multiple strong proofs, a notification using the strong proof;

keep each of the multiple strong proofs as a strong proof if a response to one or more of the notifications is received within a threshold amount of time; and expire each of the multiple strong proofs if no response to the notifications is received within the threshold amount of time.

17. One or more computer hardware storage devices as recited in claim 13, wherein the multiple instructions further cause the one or more processors to:

identify that the account is a pre-existing account of the user; and automatically identify, in response to the account being identified as a pre-existing account, each of multiple proofs of the pre-existing account as a strong proof associated with the account.

18. One or more computer hardware storage devices as recited in claim 13, wherein the multiple instructions further cause the one or more processors to permit access to a service associated with the account even if the requested change to the password is not permitted.

19. One or more computer hardware storage devices as recited in claim 13, wherein the multiple strong proofs of the account comprise: a wireless phone number of the user, an email address of the user, and a secret key of a computing device of the user.

20. A system comprising:

one or more computer processors; and one or more computer readable hardware storage devices, communicatively coupled to the one or more computer processors, a user account information store embodied on the one or more computer readable hardware storage devices and configured to be used by the one or more computer processors to store both a password as a normal proof and multiple strong proofs associated with an account of a user; and an account security control module embodied on the one or more computer readable hardware storage devices and configured to be used by the one or more computer processors to access the user account information store and to:

in response to a received request to change a strong proof of the multiple strong proofs, attempt to confirm the request by notifying, using one or more of the multiple strong proofs, the user, permit the change if the request is confirmed, and keep the strong proof unchanged if the request is not confirmed; and in response to a received indication that all of the multiple strong proofs have been lost, communicate, using each of one or more of the multiple strong proofs, a notification using the strong proof, keep each of the multiple strong proofs as a strong proof if a response to one or more of the notifications is received within a threshold amount of time, and expire each of the multiple strong proofs if no response to the notifications is received within the threshold amount of time.

* * * * *